(12) United States Patent
Allen et al.

(10) Patent No.: US 11,119,739 B1
(45) Date of Patent: Sep. 14, 2021

(54) EXECUTABLE PROGRAMS REPRESENTING FIREWALL RULES FOR EVALUATING DATA PACKETS

(71) Applicant: Amazon Technologies, Inc., Seattle, WA (US)

(72) Inventors: Stewart Allen, Seattle, WA (US); Dheerendra Talur, Sammamish, WA (US); Venkat Maithreya Paritala, Seattle, WA (US); Joseph Magerramov, Bellevue, WA (US); Anthony Liguori, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/448,523

(22) Filed: Jun. 21, 2019

(51) Int. Cl.
*H04L 29/06* (2006.01)
*G06F 9/455* (2018.01)
(Continued)

(52) U.S. Cl.
CPC .......... *G06F 8/425* (2013.01); *G06F 9/30047* (2013.01); *G06F 9/4552* (2013.01);
(Continued)

(58) Field of Classification Search
CPC ..... G06F 2221/2101; G06F 2221/2105; G06F 8/425; G06F 9/30047; G06F 9/4552; G06F 9/45558; G06F 21/55; G06F 21/577; G06F 12/0835; G06F 12/0893; G06F 12/0804; G06F 12/0811; G06F 2212/621; G06F 9/4881; G06F 12/0607; G06F 12/0813; H04L 63/1416; H04L 63/1425;
(Continued)

(56) References Cited

U.S. PATENT DOCUMENTS

| | | | |
|---|---|---|---|
| 2006/0104232 A1* | 5/2006 | Gidwani | H04W 28/18 370/328 |
| 2007/0204107 A1* | 8/2007 | Greenfield | G06F 12/0864 711/128 |

(Continued)

OTHER PUBLICATIONS

Schramm et al., The Impact of Cache Partitioning on Software-Based Packet Processing, 6 pages (Mar. 2019).*

*Primary Examiner* — Thuy Dao
(74) *Attorney, Agent, or Firm* — Lee & Hayes, P.C.

(57) ABSTRACT

Techniques for compiling firewall rules into byte code or assembly code that can be loaded into cache memory of a processor and executed to evaluate received data packets. Rather than representing firewall rules in mid- or high-level languages stored in main memory, the techniques described herein include compiling the firewall rules into bytecode or assembly code, and distributing the code to the data plane. A packet-processing device may load the code representing the firewall rules into instruction cache of the processor. Further, the packet-processing device receives a data packet and extracts packet context data indicating attributes of the packet, and load the packet context data into a data cache of the processor. The processor can then execute the byte code or assembly code representing the firewall rules to evaluate the packet context data without having to access main memory to determine whether allow or block the data packet.

19 Claims, 12 Drawing Sheets

(51) Int. Cl.
*H04L 29/08* (2006.01)
*H04L 12/753* (2013.01)
*G06F 8/41* (2018.01)
*G06F 9/30* (2018.01)

(52) U.S. Cl.
CPC ...... *G06F 9/45558* (2013.01); *H04L 63/0263* (2013.01); *H04L 63/101* (2013.01); *G06F 2009/45595* (2013.01)

(58) Field of Classification Search
CPC . H04L 63/0263; H04L 63/20; H04L 63/0236; H04L 63/1408; H04L 63/0227; H04L 63/101; H04L 63/1441; H04L 2463/141; H04L 63/10; H04L 63/02; H04L 21/53; H04L 8/425; H04L 9/30047; H04L 9/4552; H04L 9/45558
See application file for complete search history.

(56) References Cited

U.S. PATENT DOCUMENTS

| | | | |
|---|---|---|---|
| 2008/0276075 A1* | 11/2008 | Luick | G06F 9/3853 712/216 |
| 2012/0027078 A1* | 2/2012 | Takimoto | H04N 19/117 375/240.02 |
| 2013/0019301 A1* | 1/2013 | Reddy | H04L 63/168 726/11 |
| 2013/0074174 A1* | 3/2013 | Huang | H04L 45/04 726/12 |
| 2015/0277949 A1* | 10/2015 | Loh | G06F 12/145 711/152 |
| 2018/0007000 A1* | 1/2018 | Bansal | G06F 12/0813 |
| 2019/0132289 A1* | 5/2019 | Hulick, Jr. | H04L 63/0281 |

* cited by examiner

EXECUTABLE PROGRAMS REPRESENTING FIREWALL RULES FOR EVALUATING DATA PACKETS

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. Further, these VM instances may be grouped into virtual networks or subnetworks for the users.

Users of the VM instances may choose to utilize virtual firewalls to control inbound and outbound traffic between VM instances. The virtual firewalls may include firewall rules that are used for packet filtering and monitoring. For example, the firewall rules may be expressed as a series of matches and actions where each firewall rule specifies allowable parameters for data packets that, if matched to packet context data of a received packet, will result in the received packet being forwarded past the firewall to its destination. However, evaluating these firewall rules against packets can be computationally expensive, time consuming, and inefficient.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
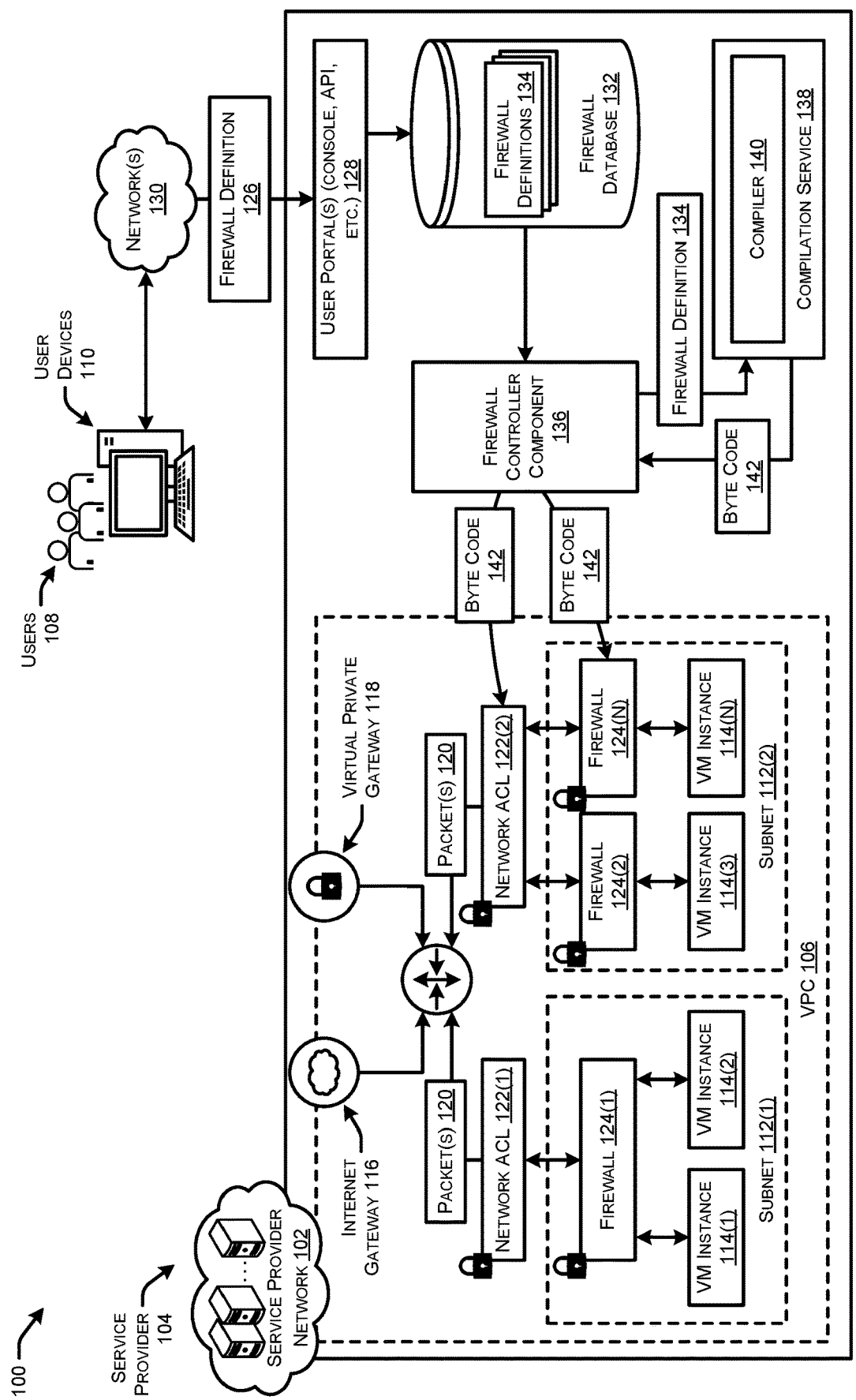
FIG. 1 illustrates a system-architecture diagram of an example environment in which a service provider utilizes a compilation service to compile firewall definition for users' resources from high-level or mid-level computer languages into low-level computer languages. Once compiled into a low-level computer language, the firewall rules are distributed to packet-processing devices to be executed to evaluate data packets.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

As noted above, the service provider networks may utilize virtualization technologies such that the computing devices can each host multiple VM instances that appear and operate as independent computing devices to support workloads of users. Rather than allocating all of the computing resources of a physical computing device to support a single workload for a user, the computing resources of a physical computing device can be allocated amongst multiple VM instances that support different workloads.

A user of a service provider network may have portions of physical resources in the service provider network allocated for their use, and have one or more virtual resources, such as VM instances, running thereon to provide cloud services for the user. This logically and virtually isolated section of computing resources may be a virtual private cloud (VPC) that the user has control for customization and configuration. This VPC may include security features, such as firewalls and network access control lists (ACLs) to enable inbound and outbound filtering at the instance level, and at a sub-network level.

The service provider network may provide the user with the ability to define security rules for their firewalls, such as specific allow rules that allow or block inbound and outbound traffic. The security rules may each define specific attributes or contextual data that the packets in the traffic are to satisfy if they are to be allowed to be communicated to their destination address or port. For example, an inbound security rule may be required to specify the protocol type, the source of the traffic (or "sender"), and the destination port or range. If a packet includes packet data that matches with an allow rule of the security rules, the packet and associated data flow may be allowed through the virtual firewall and permitted to be communicated to the destination port or range. Conversely, the virtual firewall may block packets and data flows that do not include packet context data that corresponds to an allow firewall rule.

To implemented virtual firewalls, a packet-processing device (or firewall-hosting device) may be provided with code representing the firewall rules. The packet-processing device may be any type of device, such as a server, a router, a load balancer, and/or a hosting device, that can evaluate firewall rules against properties of received packets. In some instances, the packet-processing device may be hosting VM instances that the virtual firewall is applied to, and in other examples, the packet-processing device may be a separate device that receives the packets or data flow before it reaches a destination Traditionally, the virtual firewall rules may comprise a grouping of high- or mid-level code, such as C++ code, that describes properties or attributes of data packets, and resulting actions (e.g., allow, block, etc.). This C++ code representing the firewall rules may be expressed in a data structure that is created in main memory of the packet-processing device. Upon receiving a data packet in a data flow (e.g., the first data packet), the packet-processing device may analyze the different allowable properties (e.g., protocol type, port numbers, etc.) defined in the various firewall rules stored at different locations across the main memory. However, the amount of time taken to access main memory by the processor to evaluate the data packet properties with the firewall rules may be relatively slow as compared to simply executing instructions stored in cache memory (e.g., L1 cache memory, L2 cache memory, etc.). Accordingly, representing firewall rules using high/mid-level programming code, such as C++ code, JSON code, etc., may be slow and computationally intensive, particularly for virtual firewalls with large sets of firewall rules.

The techniques described herein include compiling firewall rules into byte code or assembly code that can be loaded into cache memory of a processor and executed by the processor to evaluate data packets in a data flow against the firewall rules. Rather than representing firewall rules in mid-level languages (e.g., C++, Python, etc.) or high-level languages (e.g., JSON, cleartext, etc.) and storing the rules in main memory, the techniques described herein include compiling the firewall rules from the high/mid-level languages into bytecode or assembly code, and distributing the byte code or assembly code to the data plane. After receiving the low-level code that represents the firewall rules, a packet-processing device may load the firewall rules directly into cache memory, such as an instruction cache (i-cache) of a processor, to evaluate received data packets. Further, when the packet-processing device receives a data packet, the device may extract packet context data that includes attributes of the packet that are to be evaluated, and load the packet context data into data cache (d-cache) of the processor. The processor can then execute the set of firewall instructions represented in the byte code or assembly code that is loaded into the i-cache against the packet context data in the d-cache without having to access main memory to compare packet context data such as protocol types, designation port values, CIDR blocks, and/or other packet context data. Byte code, as used herein, refers to program code that has been compiled from source code into a form of instruction set for efficient execution by a software interpreter. As described herein, a software interpreter may further compile byte code into a specific form of machine code that can be recognized by a particular processor type of a host that is selected for packet filtering.

In some examples, users of the service provider network may provide a firewall description for virtual resources (e.g., VM instances, virtual networks, etc.) that defines allow rules and/or block rules. In some examples, the firewall description may be written or described by the user in a high-level programming language, such as JavaScript Object Notation (JSON), eXtensible Markup Language (XML), or a mid-level programing language (e.g., C++, Python, etc.). The service provider network may store the firewall descriptions for users in one or more databases indicating the user account for the users.

The service provider network may include a firewall compilation service configured to generate, convert, or otherwise compile the description of the firewall rules from the high- or mid-level language into a lower-level language, such as byte code including an extended Berkeley Packet Filter (eBPF) program of an in-kernel virtual machine, or assembly code that is executable by a processor, such as x86 code or Advance RISC Machine (ARM) assembly code.

In examples where the firewall definition is expressed in a high-level template language, such as JSON, XML, clear text, and/or other human-readable and computer-readable languages, the firewall compilation service may include a generator that generates mid-level code, such as C++ code, from the high-level template language. The firewall compilation service may further utilize a compiler that compiles the mid-level, or high-level, code representing the firewall rules into low-level code such as eBPF code.

As part of the compilation of the mid-level or high-level code into the low-level code, the firewall compilation service may utilize a compiler with front-ends for high-level and/or mid-level code. For example, the firewall compilation service may utilize a compiler with front-ends and tooling infrastructure for languages in the C language family (e.g., C, C++, Objective C/C++, OpenCL, CUDA, Renderscript, etc.), Fortran, *Julia*, JSON, and/or other high-level or mid-level languages or code.

The front-end may analyze the input code and build an internal representation (IR) of the code representing the firewall rules. While the code is represented in IR code, the compiler may perform various optimization techniques, such as removing extraneous branches in the firewall rules. After building the IR code and optimizing the IR code, a back-end of the compiler may utilize the IR code to translate or compile the IR code into the target, low-level code. The back-ends of the compiler may convert the IR code into various low-level code, such as assembly code, byte code, etc.

Once the firewall compilation service has compiled the firewall definitions into byte and/or assembly code (or machine code), the firewall compilation service may distribute the low-level code representing the firewall rules using the data plane to the appropriate packet-processing device(s) for the user's specific VPN. In some examples, the firewall rules may be network ACLs, security groups, and/or other types of firewalls.

Upon receiving the low-level code, the packet-processing device(s) may utilize the code to evaluate received data packets and determine whether to allow or block the data packets from being communicated to various virtual resources and/or hardware resources. For instance, the packet-processing device(s) may load the low-level code into i-cache memory of a processor such that the firewall rules are represented in i-cache as executable instructions, rather than being stored in a data structure in main memory. When the packet-processing device(s) receives a data packet in a data flow, the packet-processing device(s) may extract packet context data that is used to evaluate the packet using the firewall rules. The packet-processing device(s) may generate a data structure configured to fit or be loaded into d-cache on the processor where the data structure represents the packet context data that is to be compared to the firewall rules in the code in the i-cache.

The processor of the packet-processing device(s) may then execute the low-level code, which may include the use of a just-in-time (JIT) compiler to translate the byte code into appropriate assembly code. When executing the low-level code, processor may compare the firewall rules that indicate allowable packet attributes with the actual packet attributes of the packet stored in the d-cache. As noted above, the processor may efficiently do the comparisons at least because the firewall rules representing the allowable attributes may be stored in the i-cache that loads quickly into registers of the processor to compare with the packet context data in the d-cache. Depending on whether the packet context data matches with the allowable attributes in the code in the i-cache, the processor may output result of allow or block/deny for the data packet. The packet-processing device(s) may then allow the data packet, and/or any corresponding data flow, to be communicated to a destination port, or block the data packet and corresponding data flow from proceeding to the destination port or range.

The techniques described herein may improve the functioning of firewalls and packet-processing devices in various ways. For instance, the evaluation of firewall rules against received packets may be faster and computationally more efficient as data does not need to be accessed or retrieved from main memory of the packet-processing device, which is a longer and more CPU intensive process. Further, by compiling the high-level or mid-level code into low-level code, the optimization of the code performed by the compiler may result in various efficiencies, such as removing extraneous, duplicative, and/or unnecessary branches in the code representing the firewall rules. For instance, traditional firewall rules may have evaluated a narrower allow rule before reaching a broader allow rule that applies to more data packets that should be evaluated first. For instance, an allow rule may allow packets that are communicated by a particular protocol type, whereas a narrower rule may dictate specific CIDR blocks. In such examples, the optimizer may reduce unnecessary branches in the high-level or mid-level code, such as initially determining if a data packet was communicated with a permissible protocol type before determining whether the data packet was sent from a particular CIDR block, or sent to a particular CIDR block.

In some examples, the code (e.g., byte code, machine instructions, etc.) may be executed more efficiently by the processor as compared to prior art techniques. For example, the firewall rules may be represented in the byte code and/or machine instructions such that they are loaded directly into cache memory of the processor, rather than being stored and accessed in main memory. Rather than using a translator and/or matcher to evaluate firewall rules against received data packets, the byte code and/or machine instructions may simply be executed by the processor from L1 cache memory to determine whether the data packets are allowed or blocked. By representing the firewall rules in byte code and/or machine instructions, the disclosed techniques may increase the efficiency of processing and evaluation of the firewall rules.

Although the techniques described herein are with reference to virtual machines or VM instances, and networks, in some examples, the techniques are applicable to any type of virtual computing resource and/or physical resource. For example, the techniques are generally applicable to any type of virtual computing resource that is allocated underlying portions of physical computing resources and executes within a virtual machine, or independently executes on the physical computing resources. Further, the techniques are applicable to any physical computing device that may be associated with an address usable for communicating data packets. Virtual computing resources can include a container executing on a physical resource, a virtual machine instance running one or more containers, processes, software, and/or any other executable that is allocated portions of physical computing resources. As described herein, a firewall rule may include network ACLs for network and/or subnetwork boundaries and may also include security groups that are stateful and accept only between VM instances and/or elastic network interfaces (ENIs). Although techniques of this application are described with reference to a service provider network, the techniques are equally applicable for any network, device, and/or virtual resource in which an ACL of firewall is configured or used.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider utilizes a compilation service to compile firewall definition for users' resources from high-level or mid-level computer languages into low-level computer languages. Once compiled into a low-level computer language, the firewall rules are distributed to packet-processing devices to be executed to evaluate data packets.

As illustrated, a service provider network 102 may be operated and/or managed by a service provider 104. The service provider network 102 may provide various services to users 108 to fulfill their computing resource needs, such as cloud-based computing resources. For example, the service provider network 102 may provide cloud-based, scalable, and network accessible compute power services, storage services, database services, and/or other services. Users 108 may utilize user devices 110 to subscribe for use of the computing resources and/or services provided by the service provider network 102. The service provider network 102 may include an optimization service 106 that is configured to identify VM instance types to support workloads of the users 108 which optimize performance of the workloads, and refrain from underutilization or overutilization of the computing resources that support the VM instances and workloads. Further, the optimization service 106 may be configured to provide narratives to the users that explain and describe the recommendations for the VM instance types.

The service provider network 102 may span across different geographic regions, and include or be associated with a computing resource network that includes clusters of managed computing devices (e.g., servers) stored in data centers located across the different geographic regions. In this way, users 108 who have subscribed for use of the network-based services supported by computing resources in the data centers need not invest in and maintain the computing infrastructure required to implement the various services that they may need. In some examples, users 108 of the service provider network 102 may access or utilize computing resources of the computing devices in the data centers located in different geographic regions such that users 108 located in these different geographic regions are provided with access these resources and services.

Generally, the computing devices may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices may be various types of computing devices, such as devices that have different chip set generations, are from different vendors, have different hardware architectures, and so forth.

Thus, the computing resources of the computing-resource network provided by the computing devices can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The service provider 104 may provide users 108 with a virtual private cloud (VPC) 106 that may comprise an on-demand configurable pool of shared computing resources that are allocated within the service provider network 102. The VPC 106 comprise a logically, virtually isolated area within the service provider network 102 in which users 108 can create one or more subnets 112 that host one or more VM instances 114. The subnets 112 may be associated with a classless inter-domain routing (CIDR) block defined by an IP addressing scheme. Thus, subnets 112 may allow for the VM instances 114 included therein to be associated with an internal address range (e.g., IPv4 and/or IPv6 address range). The subnets 112 may be public and attached to an internet gateway 116 of the VPC 106, or private subnets 112 that are attached to a virtual private gateway 118 of the VPC 106. The subnets 112 may be associated with route tables that are added to the internet gate 116 for routing communications to the appropriate addresses or range of addresses. In some examples, each VM instance 114 is assigned an IPv4 address, an IPv6 address, or both.

Generally, the internet gateway 116 may comprise a horizontally scaled, redundant, and highly available VPC 106 component that allows communication between instances 114 in your VPC 106 and the internet. The internet gateway 116 may provide a target in your VPC route tables for internet-routable traffic, and to perform network address translation (NAT) for VM instances 114 that have not been assigned public IPv4 addresses. The internet gateway 116 may support various traffic, such as IPv4 and IPv6 traffic.

In some examples, the VM instances 114 may be unable to communicate with remote networks of the users. In such examples, the virtual private gateway 118 may be attached to the VPC 106 along with a custom route table to create a site-to-site VPN connection. In this way, the VPN connection made with the virtual private gateway 118 may allow for connection between the VPC 106 and a remote network of the user 108. The virtual private gateway 118 may support traffic such as Internet Protocol security (IPsec) VPN connections.

Accordingly, one or more packets 120 that may be part of a data flow may be communicated to, and through, the VPC 106 that come from various entities. The data packets 120 may include various attributes, such as a CIDR block from which they were sent, a destination port, a source/target port, a protocol type (e.g., transmission control protocol (TCP), user datagram protocol (UDP), etc.), and/or other attributes. In various examples, the users 108 may desire to filter the packets 120 and data flows that are able to move through their VPC and to their VM instances 114. Accordingly, the users 108 may set up network ACLs 122 to filter traffic going in or out of subnets 112, and/or firewalls 124 that control traffic going into the VM instances 114.

In some examples the network ACLs 122 may be stateless and have accept and deny rules for the packets 120. The network ACLs 122 may be placed on subnet 112 boundaries such that any traffic crossing the subnet 112 boundary gets evaluated by the network ACLs 122. The network ACLs 122 may include various firewall rules. In some examples, the network ACLs 122 may simply allow all inbound and outbound traffic of a particular protocol type, such as IPv4 and/or IPv6. In some examples, the network ACLs 122 may include firewall rules that are evaluated based on rule number. The firewall rules can specify protocol types that are allowed or blocked, specify source CIDR ranges and/or target CIDR ranges that are allowed or blocked for inbound traffic. For outbound traffic, the network ACLs 122 may specify destination CIDR ranges and/or the destination ports or ranges that are allowed or blocked. Additionally, the network ACLs 122 indicate the action for the rules, e.g., ALLOW or DENY for the specified traffic.

The firewalls 124 may be utilized to filter traffic for one or more VM instances 114. In some examples the firewalls 124 comprise security groups, which may be stateful/accept only type rules where the default action is to drop. The firewalls 124 may be virtual firewalls that control inbound and outbound traffic for the VM instances 114 that operate at the instance level. The firewall 124 include firewall rules that control inbound traffic, and a separate set of rules that control outbound traffic. The rules may specify similar types of attributes as network ACLs that are indicated as allowable rules, but the default action may be to drop or deny packets that do not match to an allow rule.

As described herein, "firewalls," "virtual firewalls," "firewall rules," etc., may generally include network ACLs 122 and firewalls 124, and/or other types of security resources not described herein. In some examples, the network ACLs 122 and firewalls 124 may run on a designated firewall-hosting device (or packet-processing device), may be run on routers or other network devices, may be run on the same servers that host the VM instances 114 that are supporting workloads or services of the users 108, and/or may operate on any other type of network device. Although the firewalls 124 and network ACLs 122 are descried as being associated with virtual resources (e.g., VM instances 114, subnets 112, etc.), the firewalls 124 and network ACLs 122 may be used to control traffic to any type of endpoint. For instance, the endpoints may be physical devices with addresses that the firewalls 124 and/or network ACLs 122 are controlling data flow to and from, or any other type of computing resource.

As illustrated, computing devices may support VM instances 114 that may be different types of VM instances 114 provided by the service provider network 102. For instance, a computing device may support one or more VM instances 114. Each VM instance 114 may support a workload of a user 108. Rather than allocating all the computing resources of an entire computing device to support a workload for the user 108, the service provider network 102 may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices. These VM instances 114 may emulate computing devices to operate and support workloads, and may have their own operating systems, processing capabilities, storage capacity, and network connections or interfaces.

Users 108 may create user accounts with the service provider 104 to utilize the resources and services of the service provider network. The users 108 may utilize their user devices 110 to communicate over one or more networks 130 (e.g., WANs, PANs, LANs, etc.) with the service provider network 102. The user devices 110 may comprise any type of computing device configured to communicate over network(s) 130, such as mobile phones, tablets, laptop computers, desktop computers, televisions, servers, and/or any other type of computing device. The users 108 may desire that the service provider network 102 host or support workloads in a computing resource network that is managed by the service provider 104. Accordingly, the users 108 may, via their user account, request that a workload be launched on their behalf, and provide workload data via one or more user portals 128 (e.g., web console, command line interface (CLI), application programming interface (API), etc.).

Further, the users 108 may provide, via the portal(s) 128, a firewall definition 126 that describes the firewall rules. The firewall definition 126 may be written in a high-level computer language (e.g., JSON, plain text, XML, etc.) and/or a mid-level computer language (e.g., Python, C, C++), etc. and stored in a firewall database 132. After being stored in the database 132, a firewall controller component 136 may receive the firewall definitions 126 in a stream of data. In some examples, the firewall controller component 136 may receive the firewall definitions 134 for new firewall rules, and/or receive modified firewall definition 126 that have been modified by the users 108.

The firewall definition 126 may include or specify rules that allow data packets 120 to pass through the network ACLs 122 and/or firewalls 124, and/or deny/block the data packets 120 from passing through the network ACLs 122 and/or firewalls 124. For instance, the firewall definition 126 may include packet parameters or attributes that indicate allowable packets 120, or blocked packets 120. The firewall rules may include one or more of protocol types used to communicate the packets 120, source addresses associated with a sender/source of the packets 120, destination addresses/ports for a target device of the packet 120, and/or other packet attributes or data. For each rule, the firewall definition 126 may indicate whether packets with those attributes are allowed ("allow" rules) through the firewall 124 and/or network ACL 122, or are blocked ("deny" rules) from proceeding through the firewall 124 and/or network ACL 122. The firewall definition 126 may be received using a template format where the user 108 inputs the packet attributes into a template or form via the console 128, and the input from the user 108 is placed into a template or form that is populated to create the firewall definition 126 in various languages (e.g., C language, JSON, text-based format, etc.).

After receiving the firewall definition 134, the firewall controller component 136 may provide the firewall definition 126 to a compilation service 138, such as by using one or more API calls. The compilation service 138 may include one or more code generators and/or compilers 140 configured to convert or translate the firewall definition 126 into byte code 142 (or assembly code) that represents the firewall rules. The bye code 142 may comprise any type of low-level code, such as an eBPF program of an in-kernel virtual machine, or assembly code that is executable by a processor, such as x86 code or Advance RISC Machine (ARM) assembly code. The byte code 142 may be returned to the firewall controller component 146, which then distributes the bye code 142 to the data plane where the firewall rules will be evaluated by various packet-processing devices. The byte code 142 may include firewall rules of the network ACLs 122, the firewalls 124, and/or other security resources.

Figure 4:
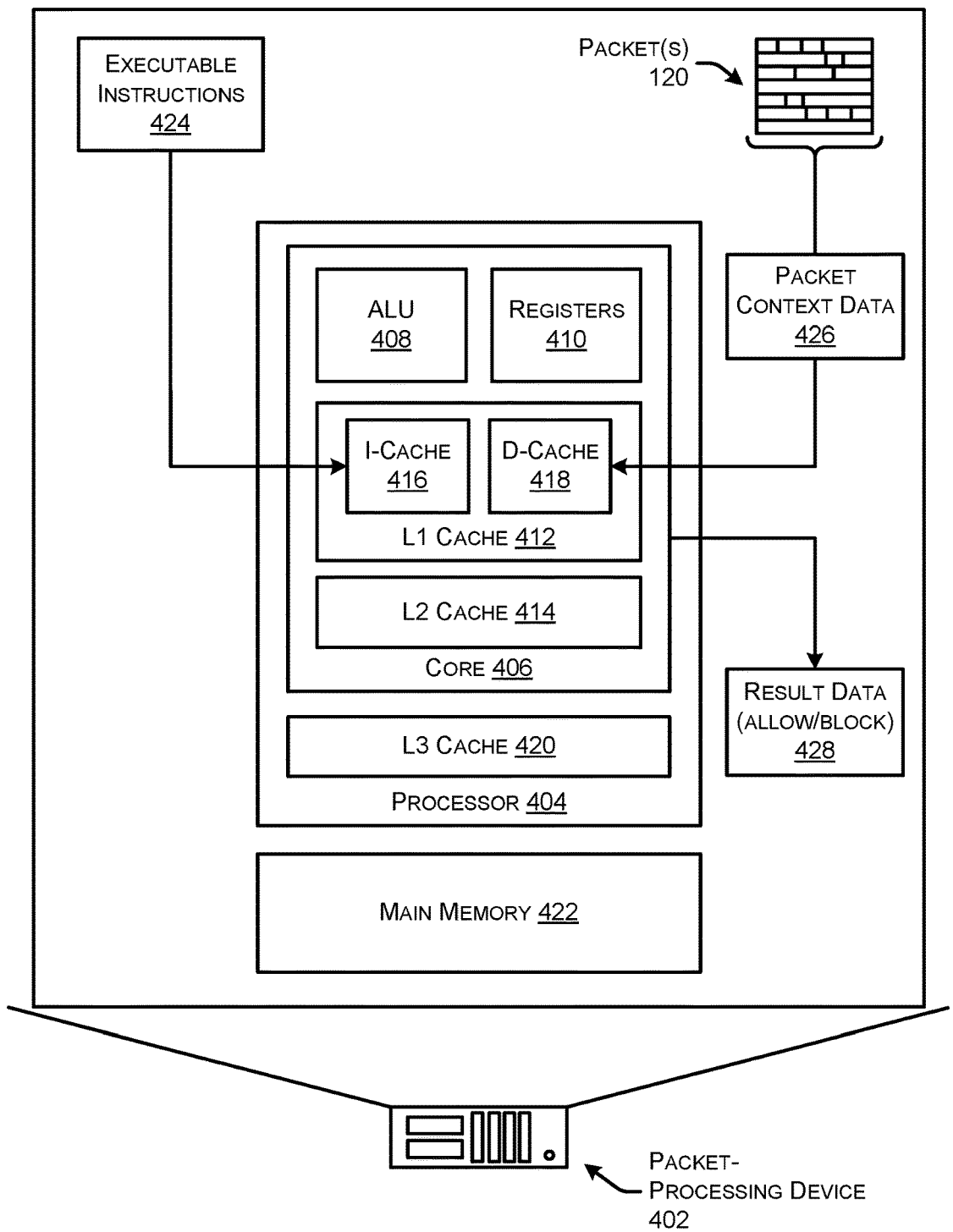
FIG. 4 illustrates a component diagram of a packet-processing device that loads executable instructions representing firewall rules into i-cache, and packet context data into d-cache, and executes the instructions to evaluate the data packet.

As described further at least with respect to FIG. 4, the packet-processing devices may receive the byte code 142 and load the byte code 142 into cache memory, such as i-cache of L1 cache of a processor. Further, the packet-processing devices may extract packet context data that is to be evaluated against the firewall rules, and load the packet context data into d-cache of the processor. In this way, the firewall rules may be represented by low-level computer language byte code 142 that is loaded into i-cache, rather than as C++ code in a data structure maintained in main memory. The packet-processing devices may then quickly execute the byte code 142 to compare the firewall rules with the packet context data and determine an action for the data packet, such as ALLOW or DENY.

Generally, the components described herein as being included in the service provider network 102 may comprise software, firmware, and/or other logic that is supported one computing device, or across more computing devices in the service provider network 102. Additionally, the components may comprise a single device, or a system of other devices.

Figure 2:
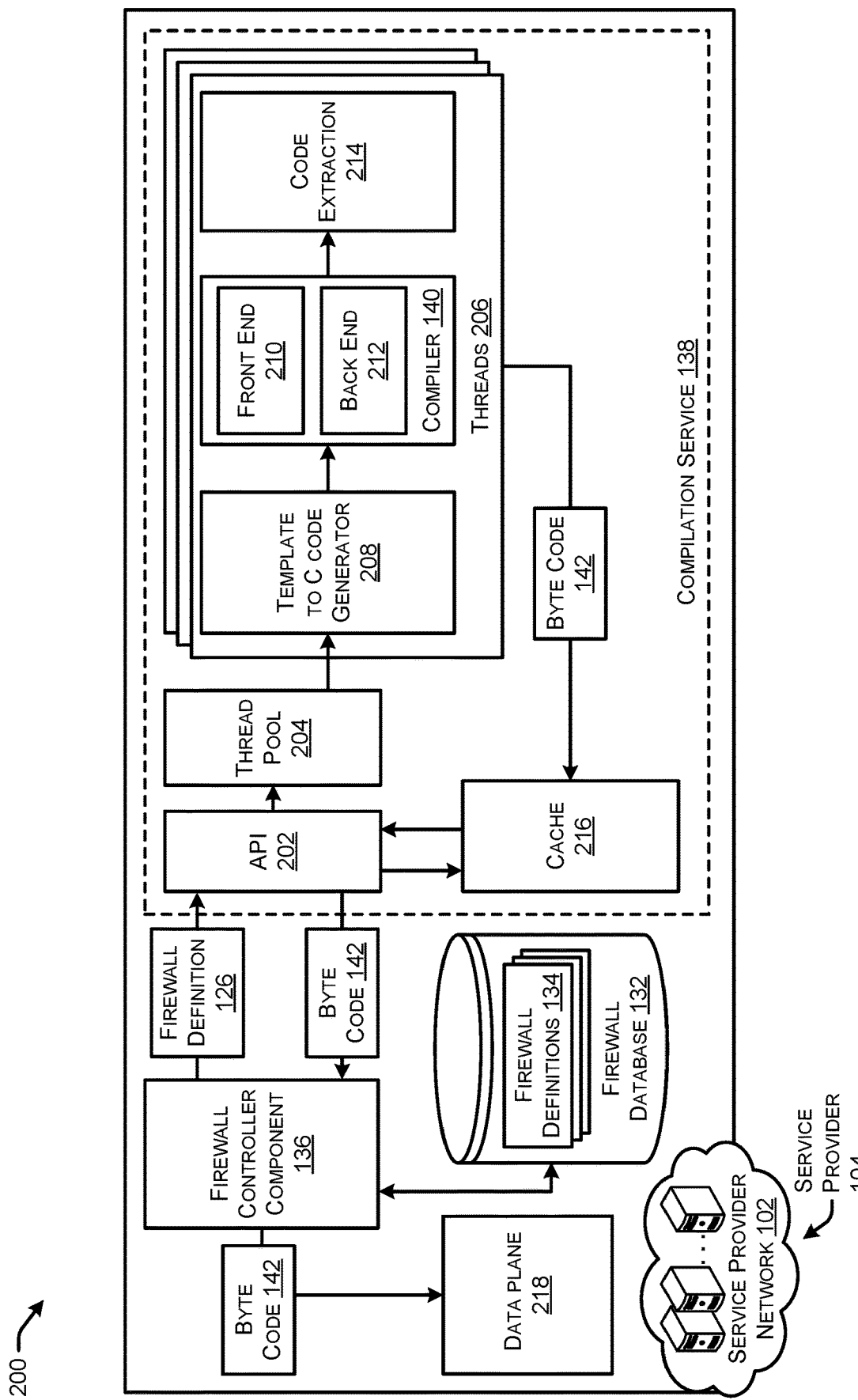
FIG. 2 illustrates a component diagram of example components of a compilation service that uses a code generator as well as a compiler to compile firewall rules in a high-level or mid-level computer language into a low-level computer language.

FIG. 2 illustrates a component diagram 200 of example components of a compilation service 138 that uses a code generator as well as a compiler to compile firewall rules in a high-level or mid-level computer language into a low-level computer language.

As illustrated, the firewall controller component 136 may receive a stream of data representing the firewall definitions 134 from the firewall database 132. In some examples, the firewall controller component 136 may receive the firewall definitions 134 upon a user 108 defining new firewalls 124 and/or network ACLs 112, and/or upon the users 108 changing or modifying existing firewall definitions 134.

To compile firewall definitions 126, the firewall controller component 136 may provide a firewall definition 126 describing firewall rules in a high- or mid-level computer language via an API 202 to a thread pool 204 of firewall definitions 126. One or more threads 206 may be executing on a fleet of instances that run the compiler 140. The threads 206 may each be supported or executing on one or more VM instances to translate or compile the firewall definition 126 into byte code 142.

A firewall definition 126 may be input into a template to C code generator 208. For instance, the templates of the firewall definition 126 may be model red in free marker that uses inverse matching. The firewall definition 126 may be, for example, JSON templates that is used to generate C code (e.g., C++ code) that represents the firewall rules of the firewall definition 126.

In some instances, the template that describes the firewall definition 126 may be created using substitution techniques where a user 108 provides input including various parameters of the firewall definition 126 via one or more APIs. Each of these parameters may indicate a value of the template that represents the firewall definition 126.

The C code may then be provided to the compiler 140, which may include a front end 210 and a back end 212. The front end 210 may comprise tooling to convert the mid-level or high-level code into intermediate representation (IR) code. For instance, the front end may include multiple front ends and tooling infrastructure for languages in the C language family (e.g., C, C++, Objective C/C++, OpenCL, CUDA, Renderscript, etc.), Fortran, *Julia*, JSON, and/or other high-level or mid-level languages or code. The front end 210 may analyze the input C code and build the IR code representing the firewall rules. While the code is represented in IR code, the compiler 140 may perform various optimization techniques, such as removing extraneous branches in the firewall rules.

After building the IR code and optimizing the IR code, the back end 212 of the compiler 140 may utilize the IR code to translate or compile the IR code into the target, low-level code (e.g., byte code 142). The back end 212 of the compiler 140 may convert the IR code into various low-level code, such as assembly code, byte code, etc. The byte code 142 may then be placed in a cache 216 and maintained for a period of time in case the firewall controller component 136 requests that a firewall definition 126 be compiled again.

The compilation service 138 may be able to obtain the byte code 142 from the cache 216 and provide it to the firewall controller component 136.

In some examples, rather than compiling a single firewall definition 126 at a time, the compilation service 138 may perform a batching operation to compile two or more firewall definitions 126 at a same time. For example, the compilation service 138 may generate one .c file that represented multiple firewall definitions 126. The .c file may include markers that indicate locations where one firewall definition 126 begins and another ends. The compiler 140 may then execute and compile the combined firewall definition from the .c file to the bye code 142. The code extraction 214 may then identify markers in the byte code 142 and extract out the byte code 142 for each of the firewall definitions. In this way, the compilation cycle can be reduced for the firewall definitions 126 by performing compilations on multiple firewall definitions 126 in a batch. For instance, a typical compilation cycle may take 30 milliseconds per firewall definition, and with a batch size of 100 firewall definitions 126, each definition 126 may take 6 milliseconds, or a 5x improvement.

In some examples, to perform the batch processing of firewall rules for multiple customers, accounts, and/or firewall rule sets, the markers may indicate the respective firewall rule sets with unique identifiers. The markers may be placed at the start and/or end of the firewall definitions 126 such that, once the firewall definitions 126 have been compiled into byte code 142 or other machine executable code, the markers may be utilized to identify where different firewall definitions 126 begin and end.

The firewall controller component 136 may then provide the byte code 142 to the data plane 218 for the appropriate devices and/or virtual machines to execute against packets that are communicated in a VPC 106.

Figure 3:
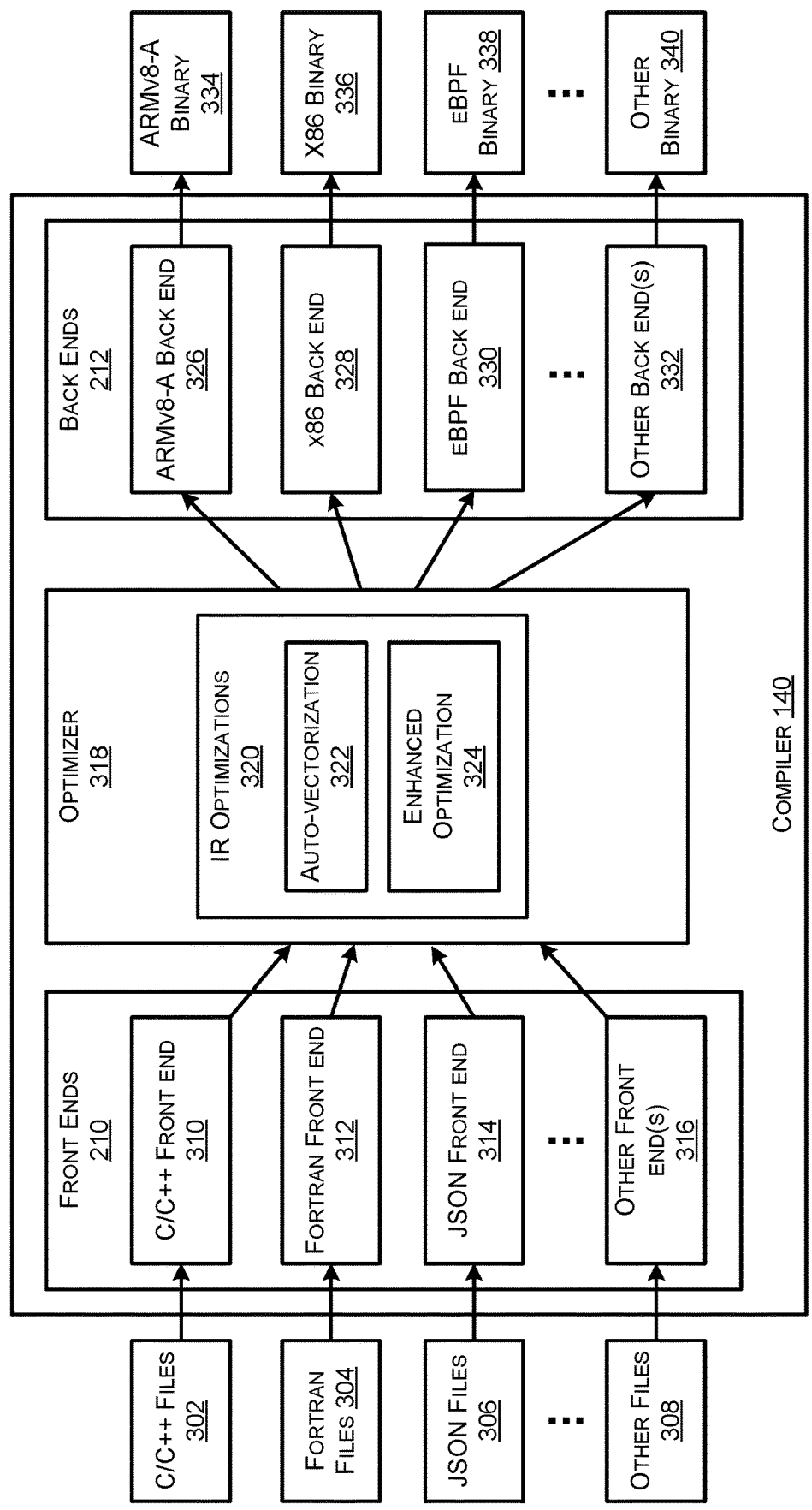
FIG. 3 illustrates a component diagram that includes components for a front end, an optimizer, and a back end of a compiler to compile firewall rules into a low-level computer language.

FIG. 3 illustrates a component diagram 300 that includes components for a front end 210, an optimizer 318, and a back end 212 of a compiler to compile firewall rules into a low-level computer language.

As illustrated, the compiler 140 may include one or more front ends 210 that receive various types of files, such as C/C++ files 302, Fortran files 304, JSON files 306, and/or other files 308 depending on the compiler 140. In some examples, the compiler 14 may be an LLVM compiler that is written in C++ and performs optimizations of programs written in various programming languages. The front ends 210 may include various front ends, such as a C/C++ front end 310, a Fortran front end 312, a JSON front end 314, and/or other front ends 316 for the compiler 140. The C/C++ front end 310 may be a Clang front end 310 that is used for C, C++, Objective C, Objective C++ m as well as other C based languages. The LLVM compiler infrastructure may be utilized as the back ends 212.

Once the front end(s) 210 have converted of compiled the input files into IR code, an optimizer may utilize various IR optimizations 320, such as auto-vectorization and/or enhanced optimization 324 for various languages. For instance, the optimizer 318 may optimize unneeded static branches out of the firewall rules represented in the IR code. Various optimizations may be performed by the optimizer 318 on the IR code, and the optimized IR code may be provided to one or more back ends 212. The back ends 212 of the compiler 140 may include various types of architecture instructions sets, such as ARMv8-a back end 326, an x86 back end 328, an eBPF back end 330, and other back end(s) 332. The other back ends 332 may generate various instructions sets including, for example, RISC-V, Qualcomm Hexagon, MIPS, Nvidia Parallel Thread Execution, Power PC, AMD TeraScale, and/or various other instruction sets for various types of processors and environments.

The back ends 212 may compile the IR code into various architecture-specific instruction sets, such as byte code and/or assembly code. For example, the back ends 212 may generate ARMv8-A binary 334, x86 binary 336, eBPF binary 338, and/or other binary 340.

In this way, the compiler 140 may be utilized to receive high-level or mid-level computer language code that describes firewall rules, and convert the code into IR code that is optimized according to various techniques. The optimized IR code may then be converted or compiled into byte code and/or machine code that represents the firewall rules.

FIG. 4 illustrates a component diagram 400 of a packet-processing device 402 that loads executable instructions representing firewall rules into i-cache, and packet context data into d-cache, and executes the instructions to evaluate the data packet. The packet-processing device 402 may comprise any type of device in the VPC 106 or service provider network 102 that may be configured to evaluate data packets 120. In some examples, the packet-processing device 402 may be running one or more VM instances 114 that evaluate the data packets 120.

The packet-processing device 402 may include a processor 404 that includes a core 406 (or multiple cores depending on the processor) with an arithmetic logic unit (ALU) 408 and registers 410. The ALU 408 may be a digital electronic circuit that performs arithmetic and bitwise operations on binary numbers, such as machine code representing firewall rules. The inputs to the ALU 408 may be operated on based on the code indicating the operation to be performed, such as comparisons between firewall rules represented in the byte code or assembly code and the packet context data for a packet 120. The registers 410 may be utilized to store outputs of operations of the ALU for later use by the ALU.

The core 406 may include L2 cache 414 as well as L1 cache 412. The L1 cache may be a split cache between i-cache 416 and d-cache 418. Depending on the type of processor 404, the processor 404 may further include L3 cache 420 on the motherboard as well. Additionally, the packet-processing device 402 may include main memory 422, such as random access memory (RAM), read-only memory (ROM), and/or other main memory 422.

The packet-processing device 402 may receive executable instructions 424 that represent the firewall rules in a low-level language, such as byte code or assembly code. The executable instructions 424 may include packet attributes indicated as allowable, or as being denied. The executable instructions 424 may be loaded into the i-cache 416 to be executed by the processor 404. Accordingly, rather than storing information of the firewall rules in main memory 422, the firewall rules and packet attributes may be included in the executable instructions 424 that are loaded into the i-cache.

The packet-processing device 402 may extract packet context data 426 from the packet 120 and generate or place the packet context data 426 into a data structure that is sized to fit in the d-cache (e.g., two cache lines, three cache lines, etc.). The packet context data 426 may include a particular protocol type used to communicate the data packet 120, a particular destination port value for the data packet, a particular CIDR block associated with the communication device that sent the data packet 120, and/or other packet information that may be specified in a firewall rule. The key fields of the packet 120 may be used to generate the packet context data 426 which is placed in the d-cache 418.

The processor 404 may then execute the executable instructions 424 to compare the allowable packet data, or deniable packet data, indicated in the firewall rules represented by the instructions 424 in the i-cache 416 with the packet context data 426 in the d-cache. The ALU 408 may execute the instructions 424 by comparing the allowed protocol type with the particular protocol type, comparing the allowed destination port value with the particular destination port value, and/or comparing the allowed CIDR block with the particular CIDR block. The ALU 408 may determine, based on the comparisons made and actions in the different firewall rules, result data 428 indicating whether the packing-processing device 402 is to block or allow the data packet 120 to continue on to a destination device or resource. For instance, the ALU may output allow if the packet context data 426 satisfies or matches to an allow rule, and may block or deny the packet 120 if the packet context data 426 does not match an allow rule and/or matches to a deny rule.

FIGS. 5-8 illustrate flow diagrams of example methods 500, 600, 700, and 800 that illustrate aspects of the functions performed at least partly by the service provider network 102 as described in this disclosure. The logical operations described herein with respect to FIGS. 5-8 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5-8 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 5:
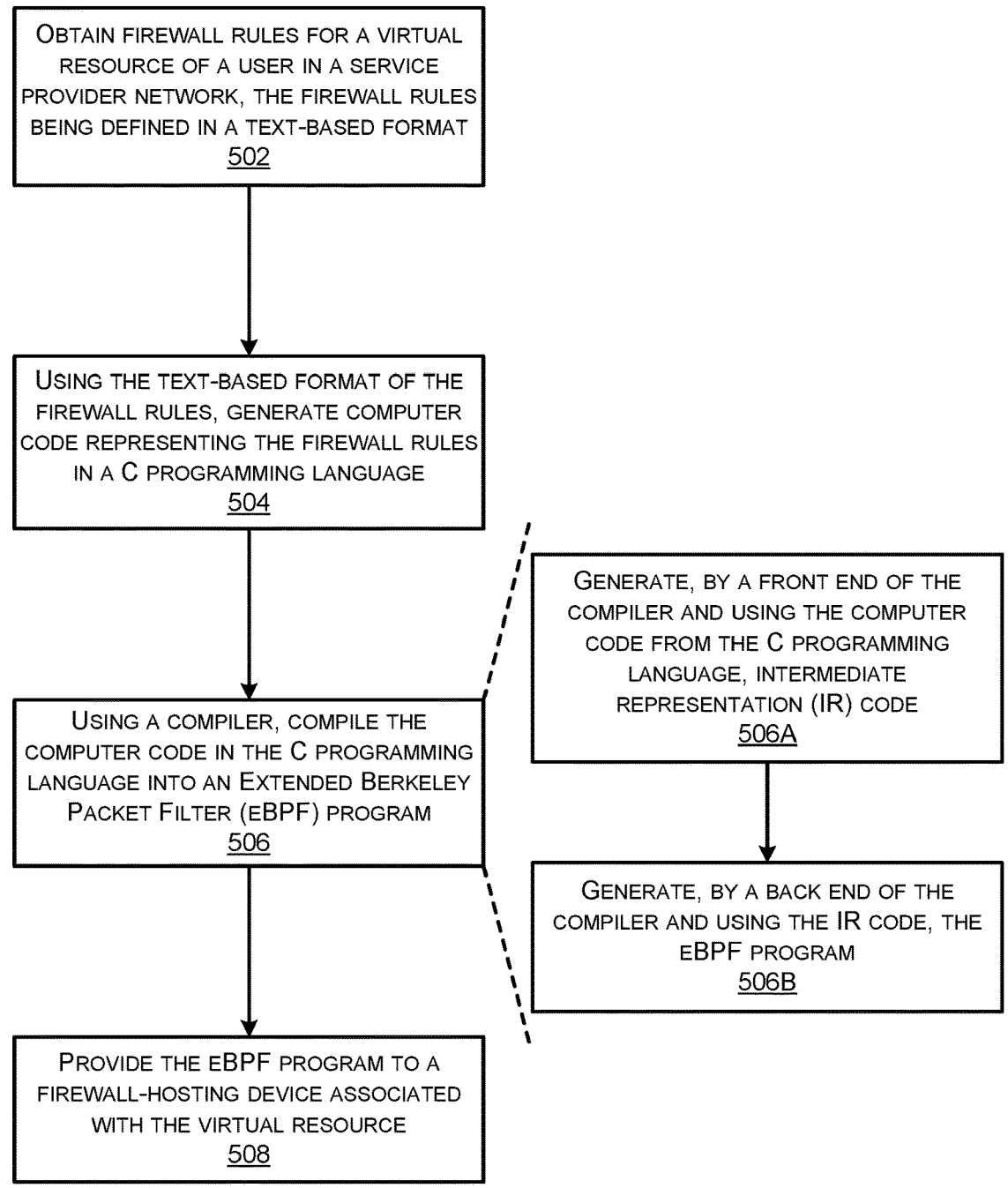
FIG. 5 illustrates a flow diagram of an example method for a service provider network to convert firewall rules from a text-based format into a C programming language, and then compiling the firewall rules in the C code into an eBPF program.

FIG. 5 illustrates a flow diagram of an example method 500 for a service provider network 102 to convert firewall rules from a text-based format into a C programming language, and then compiling the firewall rules in the C code into an eBPF program.

In some examples, the method 500 (and/or methods 600, 700, and 800) may be performed by a system comprising one or more processors one or more computer-readable media storing computer-executable instructions that, when executed by the one or more processors, cause the one or more processors to perform the various operations described.

At 502, a firewall controller component 136 may obtain firewall rules (e.g., firewall definition 126) for a virtual resource of a user 108 in a service provider network 102 where the firewall rules are defined in a text-based format (e.g., JSON, cleartext, plain text, etc.). In some examples, the virtual resource comprises a virtual network (e.g., subnet 112) of the user 108 in the service provider network 102 and the firewall rules comprise a network access control list (ACL) 122 for the virtual network, or the virtual resource comprises a virtual machine (VM) instance 114 and the firewall rules comprise a virtual firewall 124 that filters network traffic for the VM instance 114.

At 504, the compilation service 138 may, using the text-based format of the firewall rules, generate computer code representing the firewall rules in a C programming language (e.g., template to C code generator 208). At 506, the compilation service 138 may, using a compiler 140, compile the computer code in the C programming language into an Extended Berkeley Packet Filter (eBPF) program (e.g., byte code 142). In such examples, the compiling may comprise generating, by a front end 210 of the compiler 140 and using the computer code from the C programming language, intermediate representation (IR) code, and generating, by a back end 212 of the compiler 140 and using the IR code, the eBPF program.

At 508, the firewall controller component 136 may provide the eBPF program (e.g., byte code 142) to a firewall-hosting device (e.g., packet-processing device 402) associated with the virtual resource of the user 108.

In some examples, the firewall rules comprise first firewall rules and the eBPF program comprises a first eBPF program, and the method 500 may further comprise determining that a modification was made to the first firewall rules to result in second firewall rules. For instance, the user 108 may have changed the firewall rules. The method 500 may further include generating, using the compiler 140 and the second firewall rules, a second eBPF program representing the second firewall rules, and providing the second eBPF program to the firewall-hosting device (e.g., packet-processing device 402) associated with the virtual resource.

In some examples, the IR code may be optimized such as by removing, using the compiler 140 (e.g., optimizer 318), a portion of the IR code representing a conditional branch of the firewall rules.

Figure 6:
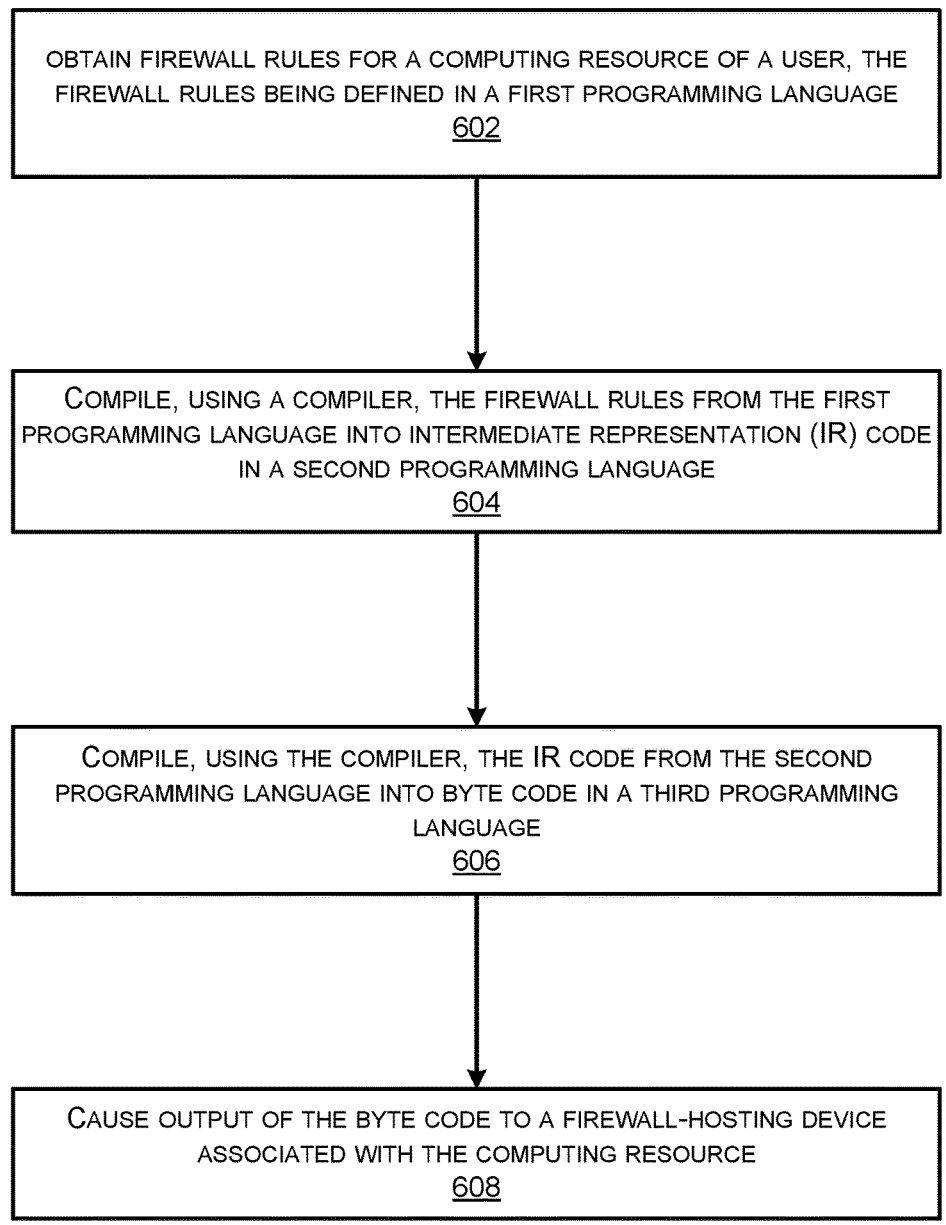
FIG. 6 illustrates a flow diagram of an example method for compiling firewall rules from a first program language into an intermediate representation, and then compiling the intermediate representation into executable code.

FIG. 6 illustrates a flow diagram of an example method 600 for compiling firewall rules from a first program language into an intermediate representation, and then compiling the intermediate representation into executable code.

At 602, a firewall controller component 136 may obtain firewall rules (e.g., firewall definition 126) for a computing resource of a user where the firewall rules are defined in a first programming language (e.g., JSON, C++, etc.).

At 604, the compilation service 138 may compile, using a compiler 140, the firewall rules from the first programming language into intermediate representation (IR) code in a second programming language. In some examples, the optimizer 318 may remove a portion of the IR code representing a conditional branch of the firewall rules.

At 606, the compilation service 138 may compile, using the compiler 140, the IR code from the second programming language into an executable program (and/or byte code) in a third programming language. The executable program in the third programming language may comprise at least one of Extended Berkeley Packet Filter (eBPF)-based code, advanced RISC machine (ARM)-based code configured to execute on an ARM-based processor, or x86-based code configured to execute on an x86-based processor.

At 608, the firewall controller component 136 may cause output of the executable program (and/or byte code) to a firewall-hosting device (e.g., packet-processing device 402) associated with the computing resource. As described herein, the computing resource may include a virtual resource (e.g., VM instance 114, subnet 112), a physical device or devices (e.g., server, router, etc.), a security group of devices, and/or any other type of destination location for a packet 120 to flow.

In some examples, the firewall rules define, in the text-based format an allowed protocol type for received data packets, an allowed destination port value for the received data packets, and/or an allowed classless inter-domain routing (CIDR) block for the received data packets. Further, the executable program (e.g., byte code 142) in the third programming language (i) includes indications of the allowed protocol type, the allowed destination port, and the allowed CIDR block, and (ii) is configured to be executed by the firewall-hosting device to allow the received packets representing the allowed protocol type, the allowed destination port, and the allowed CIDR block.

In some examples, a batch process may be performed for compiling (also in other methods 500, 700, and 800). For instance, the firewall rules comprise first firewall rules, the virtual resource comprises a first virtual resource, the firewall-hosting device comprising a first-firewall hosting device, and the method further comprises obtaining second firewall rules for a second virtual resource in the service provider network. The batching method may further include generating batch rules including the first firewall rules and the second firewall rules, adding a marker to the batch rules at a location associated with the second firewall rules, compiling, using the compiler 140, the batch rules into a batch executable program in the third programming language, extracting a portion of the batch executable program corresponding to the second firewall rules using the marker at the location associated with the second firewall rules, and causing output of the portion of the batch executable program corresponding to the second firewall rules to a second firewall-hosting device.

Figure 7A:
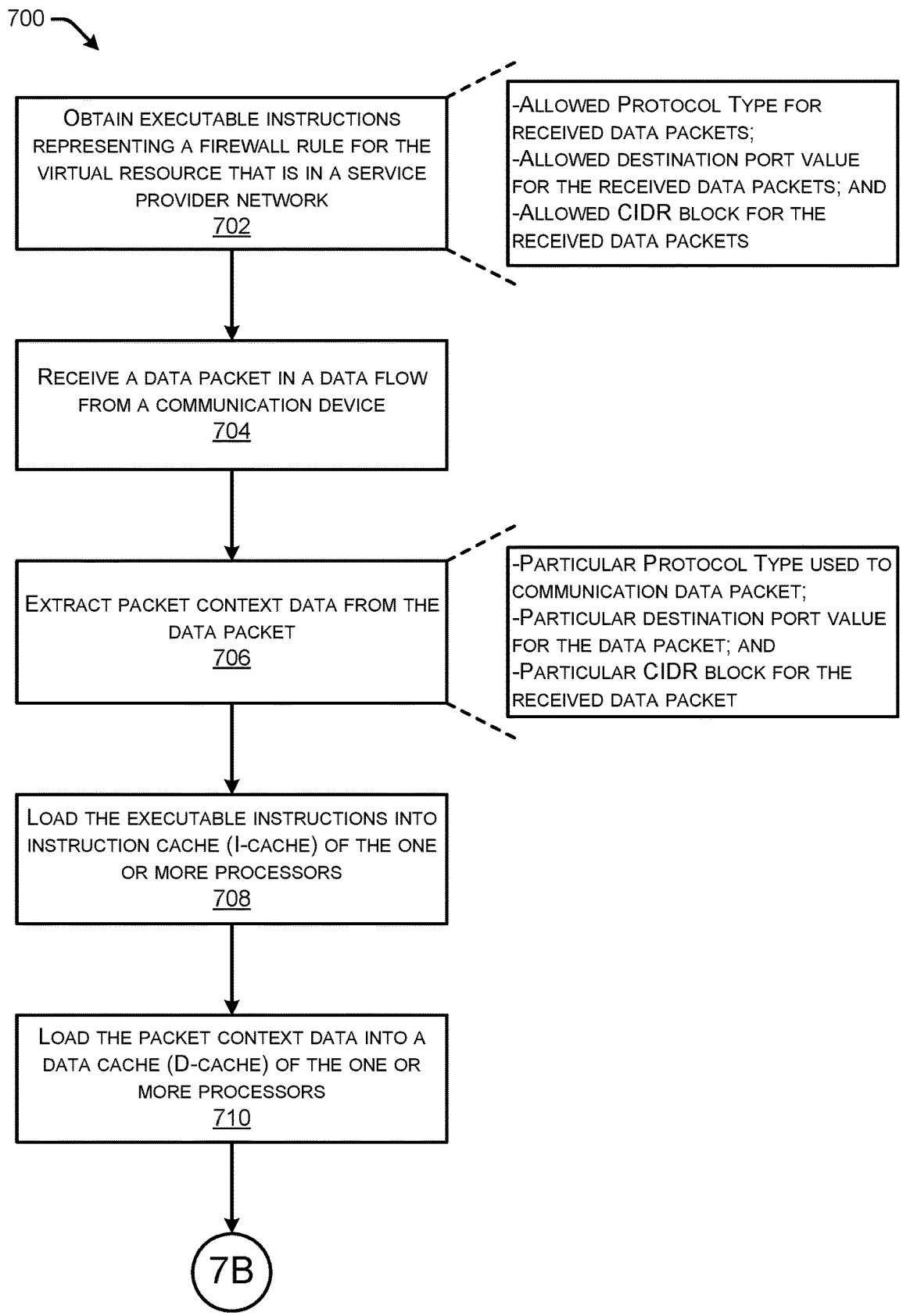
FIGS. 7A and 7B collectively illustrate a flow diagram of an example method for a packet-processing device to load executable instructions representing a firewall rule into an i-cache of a processor, extract packet context data from a received data packet, and load the packet context data into a d-cache of the processor. The packet-processing device can then execute the instructions in the i-cache and evaluate the packet context data without having to access main memory.
Figure 7B:
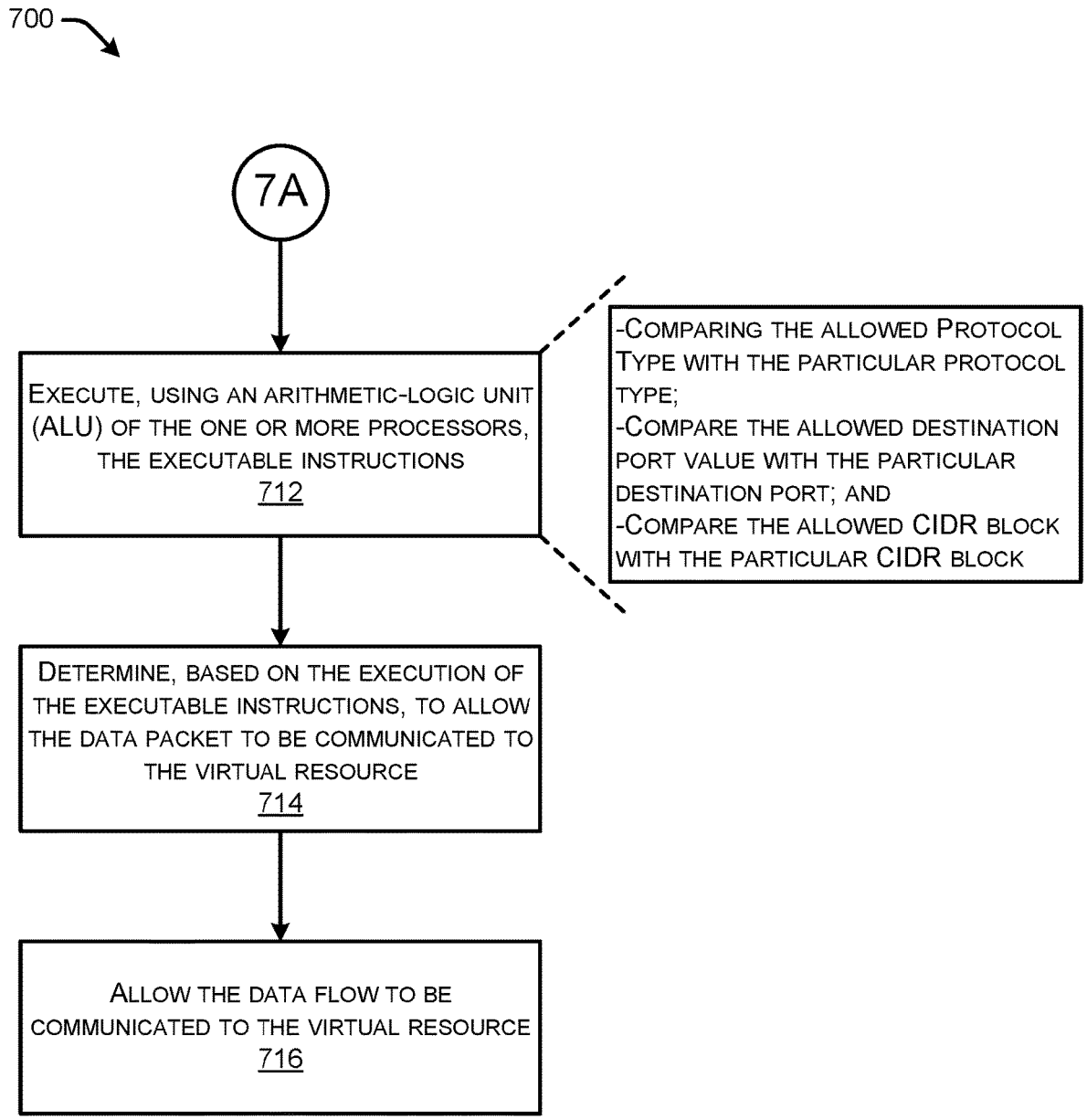

FIGS. 7A and 7B collectively illustrate a flow diagram of an example method 700 for a packet-processing device 402 to load executable instructions 424 representing a firewall rule into an i-cache 416 of a processor 404, extract packet context data 426 from a received data packet 120, and load the packet context data 426 into a d-cache 418 of the processor 404. The packet-processing device 402 can then execute the instructions 424 in the i-cache 416 and evaluate the packet context data 426 without having to access main memory 422.

At 702, the packet-processing device 402 may obtain executable instructions 424 (e.g., byte code 142) representing a firewall rule for the virtual resource that is in a service provider network 102 where the firewall rule indicates an allowed protocol type for received data packets, an allowed destination port value for the received data packets, and an allowed classless inter-domain routing (CIDR) block for the received data packets.

At 704, the packet-processing device 402 may receive a data packet 120 in a data flow from a communication device (e.g., another physical device, another virtual resource, and/or any other communicating entity).

At 706, the packet-processing device 402 may extract packet context data 426 from the data packet 120 where the packet context data 426 comprises a particular protocol type used to communicate the data packet, a particular destination port value for the data packet, and a particular CIDR block associated with the communication device.

At 708, the packet-processing device 402 may load the executable instructions 424 into instruction cache (i-cache) 416 of the one or more processors 404, and at 710, the packet-processing device 402 may load the packet context data 426 into a data cache (D-cache) 418 of the one or more processors 404.

At 712, the packet-processing device 402 may execute, using an arithmetic-logic unit (ALU) of the one or more processors, the executable instructions where the execution of the executable instructions includes comparing the allowed protocol type with the particular protocol type, comparing the allowed destination port value with the particular destination port value, and comparing the allowed CIDR block with the particular CIDR block.

At 714, the packet-processing device 402 may determine, based on the execution of the executable instructions, to allow the data packet to be communicated to the virtual resource, and at 716, the packet-processing device 402 may allow the data flow to be communicated to the virtual resource.

In some examples, the method 700 may further include receiving, from a compilation service 138, Extended Berkeley Packet Filter (eBPF) code representing the firewall rule for the virtual resource, and compiling, using a just-in-time (JIT) compiler, the eBPF code into machine code for the one or more processors. In such examples, executing the executable instructions includes executing the machine code using the ALU of the one or more processors.

In some instances, the one or more processors comprise an advanced RISC machine (ARM)-based processor or an x86-based processor, the executable instructions comprise machine code in a machine language for the ARM-based processor or the x86-based processor.

Figure 8:
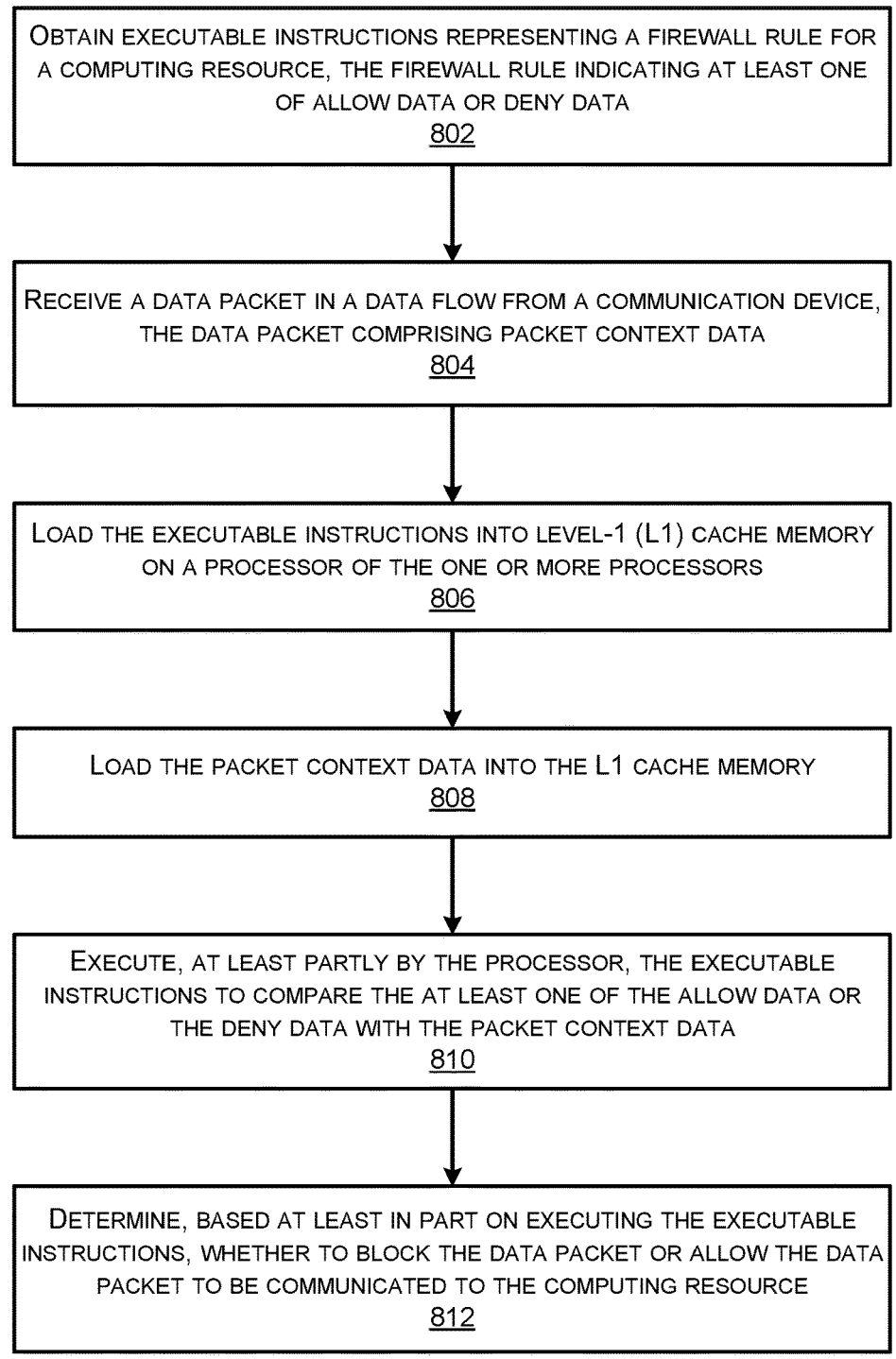
FIG. 8 illustrates a flow diagram of an example method for a packet-processing device to load executable instructions representing a firewall rule and packet context data into L1 cache of a processor. Further, the processor then executes the instructions to compare the firewall rule with the packet context data and determine whether to allow or block the data packet.

FIG. 8 illustrates a flow diagram of an example method 800 for a packet-processing device 402 to load executable instructions 424 representing a firewall rule and packet context data 426 into L1 cache 412 of a processor 404. Further, the processor 404 may then execute the instructions 424 to compare the firewall rule with the packet context data 426 and determine whether to allow or block the data packet 120.

At 802, a firewall-hosting device 402 may obtain executable instructions 424 (and/or byte code) representing a firewall rule for a computing resource where the firewall rule indicates allowable packet data (e.g., an allow rule). In some examples the computing resource may be in the service provider network 102, and in other examples the computing resource may be associated with a remote device and/or remote network from the service provider network 102.

At 804, the firewall-hosting device 402 may receive a data packet 120 in a data flow from a communication device where the data packet comprises packet context data 426. The packet context data 426 may comprise at least one of a particular protocol type used to communicate the data packet, a particular destination port value for the data packet; or a particular CIDR block associated with the communication device.

At 806, the firewall-hosting device 402 may load the executable instructions 424 into one or more caches (e.g., L1 cache 412) on a processor 402 of the firewall-hosting device 402. At 808, the firewall-hosting device 402 may load the packet context data 426 into the one or more caches 412. At 810, the firewall-hosting device 402 may execute, at least partly by the processor 404, the executable instructions 424 to compare the allowable packet data with the packet context data 426. At 812, the firewall-hosting device 402 may determine, based at least in part on executing the executable instructions 424, whether to block the data packet 120 or allow the data packet 120 to be communicated to the virtual resource.

Figure 9:
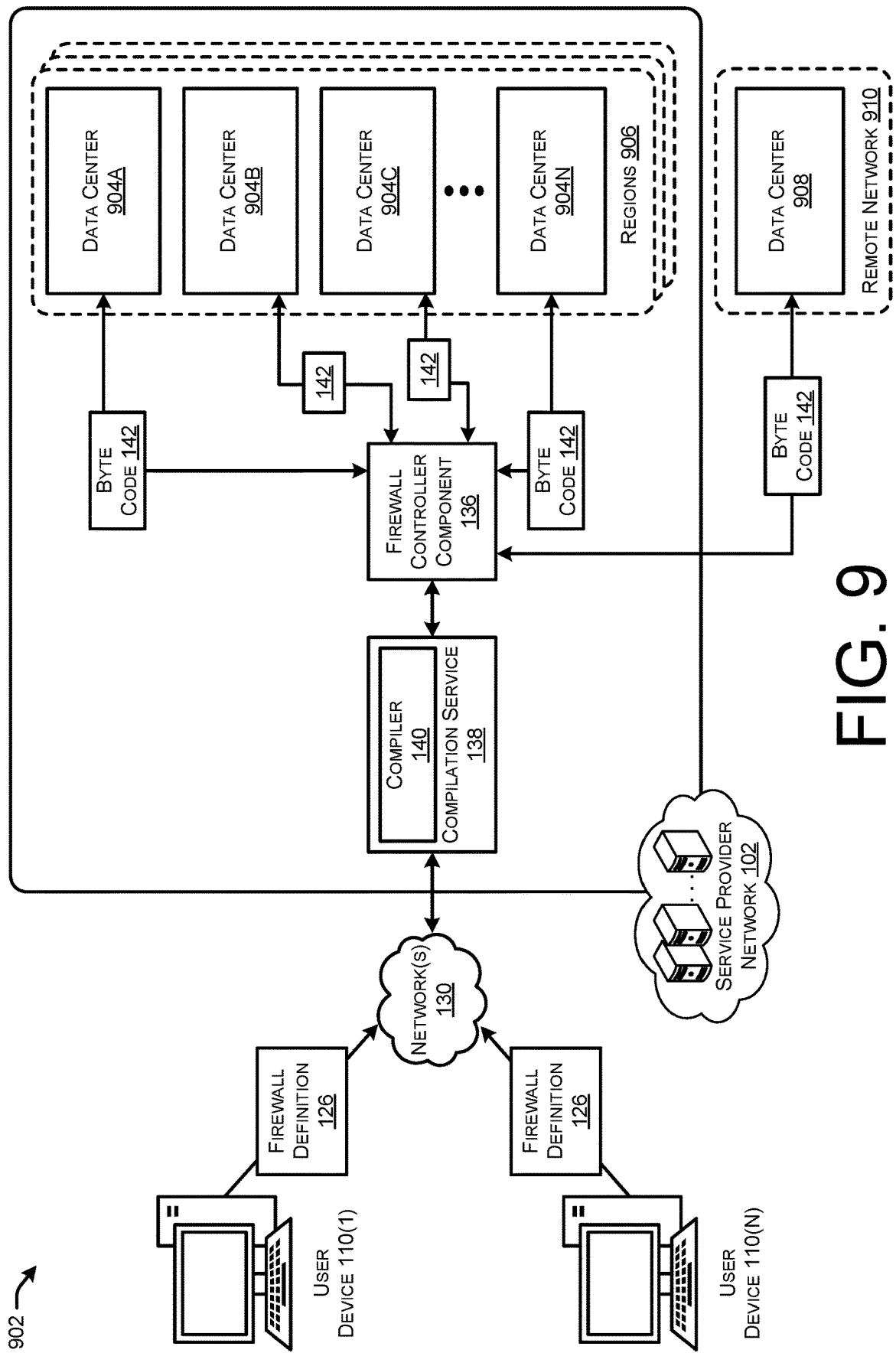
FIG. 9 is a system and network diagram that shows an illustrative operating environment that includes data centers of a service provider network that can be configured to implement aspects of the functionality described herein.

FIG. 9 is a system and network diagram that shows an illustrative operating environment that includes data centers a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 can also be located in geographically disparate locations, or regions 906. One illustrative embodiment for a data center 904 that can be utilized to implement the technologies disclosed herein will be described below with regard to FIG. 10.

The users 108 of the user devices 110 that utilize the service provider network 102 may access the computing resources provided by the service provider network 102 over any wired and/or wireless network(s) 130, which can be a wide area communication network ("WAN"), such as the Internet, an intranet or an Internet service provider ("ISP") network or a combination of such networks. For example, and without limitation, a user device 110 operated by a user 108 of the service provider network 102 may be utilized to access the service provider network 102 by way of the network(s) 130. It should be appreciated that a local-area network ("LAN"), the Internet, or any other networking topology known in the art that connects the data centers 904 to remote clients and other users can be utilized. It should also be appreciated that combinations of such networks can also be utilized.

As illustrated, user devices 110 may be utilized to provide at least portions of firewall definitions 126 to the compilation service 138. The compilation service 138 may compile the firewall definitions 126 into byte code 142 that is provided to the firewall controller component 136 which distributes the byte code 142 to the data plane. For instance, the byte code 142 may be provided to devices in the data centers 904 across the regions 906 of the service provider network 102. In some examples, the byte code 142 may further be provided or distributed to devices in a remote data center 908 that is in a remote network 910. The remote network 910 may be managed by a third-party other than the service provider 104. In some examples, the service provider 104 may provide devices for the third-party to use in their data center 908. For instance, the service provider 104 may lend, rent, or otherwise provide a rack of equipment to be placed in a remote data center 908. The byte code 142 may be provided to those devices, and/or simply devices of the third-party, to be utilized to evaluate the respective firewall definition 126 against data packets 120 flowing in the remote network 910.

Figure 10:
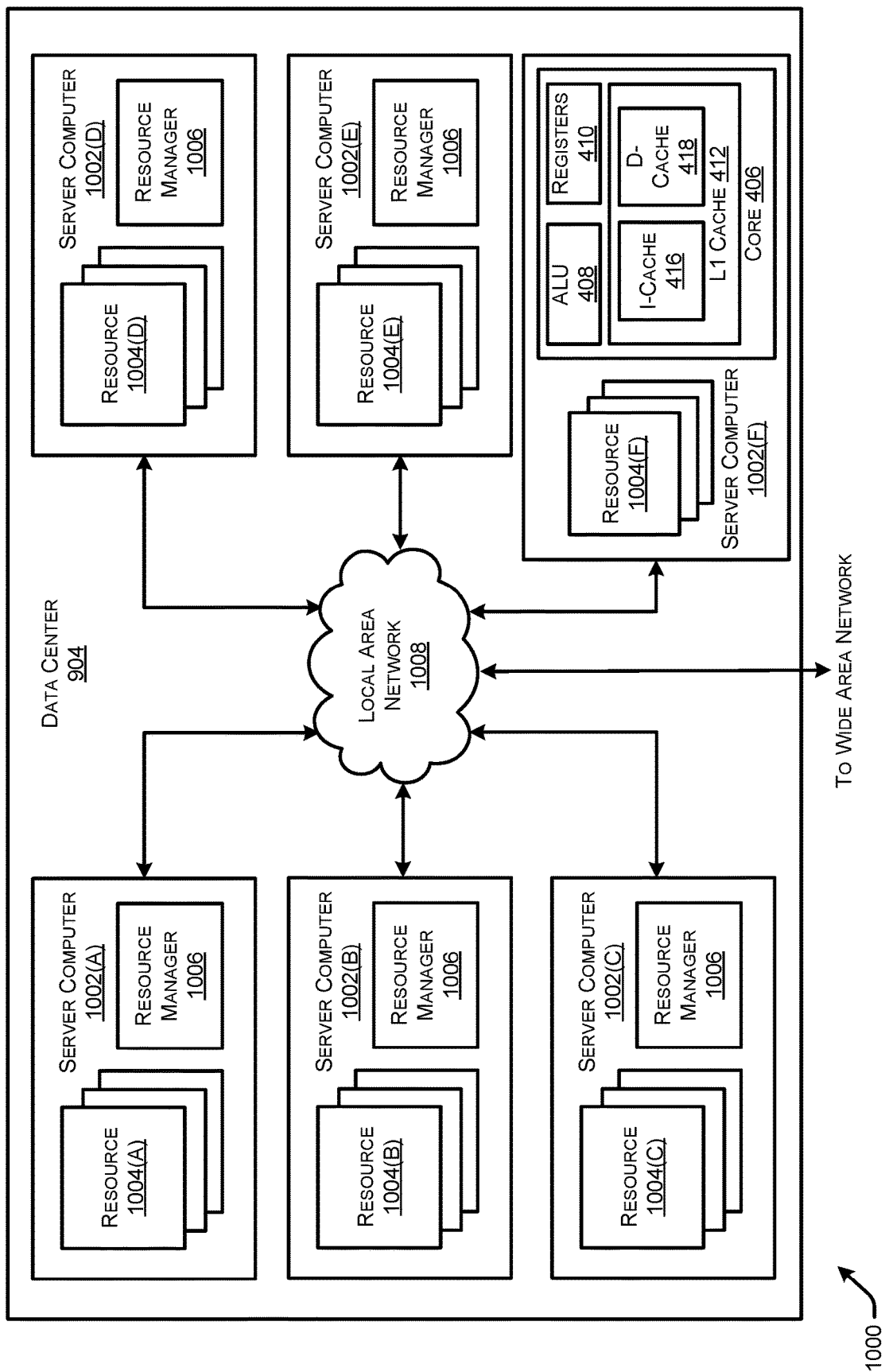
FIG. 10 is a computing system diagram illustrating a configuration for a data center that can be utilized to implement aspects of the technologies disclosed herein.

FIG. 10 is a computing system diagram 1000 that illustrates one configuration for a data center 1004 that implements aspects of the technologies disclosed herein. The example data center 1004 shown in FIG. 10 includes several server computers 1002A-1002F (which might be referred to herein singularly as "a server computer 1002" or in the plural as "the server computers 1002") for providing computing resources 1004A-1004E. In some examples, the resources 1004 and/or server computers 1002 may include, be included in, or correspond to, the computing devices described herein.

The server computers 1002 can be standard tower, rack-mount, or blade server computers configured appropriately for providing the computing resources described herein (illustrated in FIG. 10 as the computing resources 1004A-1004E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single server computer 1002. Server computers 1002 in the data center 1004 can also be configured to provide network services and other types of services.

In the example data center 1004 shown in FIG. 10, an appropriate LAN 1008 is also utilized to interconnect the server computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1002A-1002F in each data center 1004, and, potentially, between computing resources in each of the server computers 1002. It should be appreciated that the configuration of the data center 1004 described with reference to FIG. 10 is merely illustrative and that other implementations can be utilized.

Figure 11:
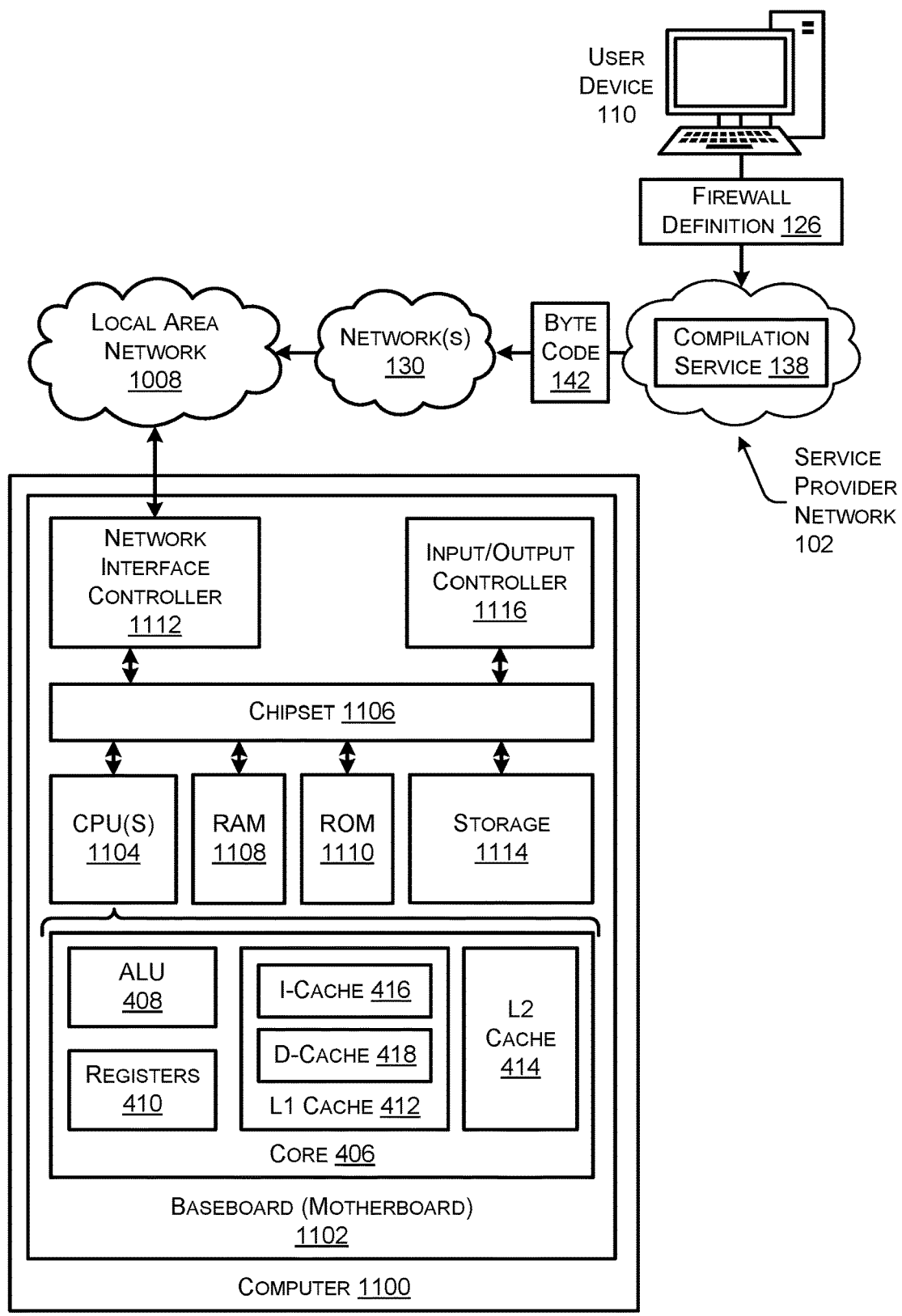
FIG. 11 is a computer architecture diagram showing an illustrative computer hardware architecture for implementing a computing device that can be utilized to implement aspects of the various technologies presented herein.

FIG. 11 shows an example computer architecture for a computer 1100 capable of executing program components for implementing the functionality described above. The computer architecture shown in FIG. 11 illustrates a conventional server computer, workstation, desktop computer, laptop, tablet, network appliance, e-reader, smartphone, or other computing device, and can be utilized to execute any of the software components presented herein. In some examples, the server computer 1100 may correspond to, or be the same as or similar to, a computing device described in FIG. 4.

The computer 1100 includes a baseboard 1112, or "motherboard," which is a printed circuit board to which a multitude of components or devices can be connected by way of a system bus or other electrical communication paths. In one illustrative configuration, one or more central processing units ("CPUs") 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1112. The chipset 1106 can provide an interface to a RAM 1108, used as the main memory in the computer 1100. The chipset 1106 can further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as the network 1008. The chipset 1106 can include functionality for providing network connectivity through a network interface controller (NIC) 1112, such as a gigabit Ethernet adapter. The NIC 1112 is capable of connecting the computer 1100 to other computing devices over the network 1008 (or 120). It should be appreciated that multiple NICs 1112 can be present in the computer 1100, connecting the computer to other types of networks and remote computer systems.

The computer 1100 can include storage 1114 (e.g., disk) that provides non-volatile storage for the computer. The storage 1114 can consist of one or more physical storage units. The storage 1114 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage 1114 by detecting the physical states or characteristics of one or more particular locations within the physical storage units.

In addition to the storage 1114 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the service provider network 102, and or any components included therein, may be supported by one or more devices similar to computer 1100. Stated otherwise, some or all of the operations performed by the service provider network 102, and or any components included therein, may be performed by one or more computer devices 1100 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1114 can store an operating system utilized to control the operation of the computer 1100. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1114 can store other system or application programs and data utilized by the computer 1100.

In one embodiment, the storage 1114, RAM 1108, ROM 1110, and/or other computer-readable storage media may be encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various techniques described above. The computer 1100 can also include computer-readable storage media having instructions stored thereupon for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

As described herein, the service provider network 102 may include one or more hardware processors (processors), one or more devices, configured to execute one or more stored instructions. The processor(s) may comprise one or more cores. Further, the service provider network 102 may include one or more network interfaces configured to provide communications between the service provider network 102 and other devices, such as the user device(s) 110, and/or other systems or devices in the service provider network 102 and/or remote from the service provider network 102. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi, and so forth.

The service provider network 102 may also include computer-readable media that stores various executable components (e.g., software-based components, firmware-based components, etc.). In addition to various components discussed in FIGS. 1-4, the computer-readable-media may further store components to implement functionality described herein. While not illustrated, the computer-readable media may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include one or more data stores which may comprise one, or multiple, repositories or other storage locations for persistently storing and managing collections of data such as databases, simple files, binary, and/or any other data. The data store(s) may include one or more storage locations that may be managed by one or more database management systems.

To utilize the services provided by the service provider network 102, users 108 may register for an account with the service provider network 102. For instance, users 108 may utilize a user device 110 to interact with an identity and access management (IAM) component that allows the users 108 to create user accounts with the service provider network 102. Generally, the IAM component may enable the users 108 to manage their workloads and other computing resources securely. Using the IAM component, the users 108 may manage their VM instances 114 as described herein.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A packet-processing device that controls data flow to a virtual resource, the packet-processing device comprising:
one or more processors; and
one or more computer-readable media storing computer-executable instructions that, when executed by the one or more processors, cause the one or more processors to:
obtain executable instructions representing a firewall rule for the virtual resource that is in a service provider network, the firewall rule indicating:
an allowed protocol type for received data packets;
an allowed destination port value for the received data packets; and
an allowed classless inter-domain routing (CIDR) block for the received data packets; and
receive a data packet in a data flow from a communication device;
extract packet context data from the data packet, the packet context data comprising:
a particular protocol type used to communicate the data packet;
a particular destination port value for the data packet; and
a particular CIDR block associated with the communication device;
load the executable instructions into an instruction cache (I-cache) of the one or more processors;
load the packet context data into a data cache (D-cache) of the one or more processors;
execute, using an arithmetic-logic unit (ALU) of the one or more processors, the executable instructions, wherein the execution of the executable instructions includes:
comparing the allowed protocol type with the particular protocol type;
comparing the allowed destination port value with the particular destination port value; and
comparing the allowed CIDR block with the particular CIDR block;
determine, based on the execution of the executable instructions, to allow the data packet to be communicated to the virtual resource; and
allow the data flow to be communicated to the virtual resource.

2. The packet-processing device of claim 1, comprising further computer-executable instructions that, when executed by the one or more processors, cause the one or more processors to:
receive, from a compilation service, Extended Berkeley Packet Filter (eBPF) code representing the firewall rule for the virtual resource; and
compile, using a just-in-time (JIT) compiler, the eBPF code into machine code for the one or more processors, wherein executing the executable instructions includes executing the machine code using the ALU of the one or more processors.

3. The packet-processing device of claim 1, wherein:
the one or more processors comprise an advanced RISC machine (ARM)-based processor or an x86-based processor; and
the executable instructions comprise machine code in a machine language for the ARM-based processor or the x86-based processor.

4. The packet-processing device of claim 1, wherein:
the virtual resource comprises a virtual network in the service provider network and the firewall rule comprises a network access control list (ACL) for the virtual network; or
the virtual resource comprises a virtual machine (VM) instance and the firewall rule comprises a virtual firewall that filters network traffic for the VM instance.

5. A computer-implemented method comprising:
obtaining, at a firewall-hosting device, byte code representing a firewall rule for a computing resource, the firewall rule indicating at least one of allow data or deny data;
receiving, at the firewall-hosting device, a data packet in a data flow from a communication device;
extracting packet context data from the data packet;
compiling the byte code into machine code that represents the firewall rule;
loading the machine code into one or more level-1 (L1) caches on a processor of the firewall-hosting device;
loading the packet context data into the one or more L1 caches;
executing, at least partly by the processor, the machine code to compare the at least one of the allow data or the deny data with the packet context data; and
determining, based at least in part on executing the machine code, whether to block the data packet or allow the data packet to be communicated to the computing resource.

6. The computer-implemented method of claim 5, wherein:
loading the machine code into the one or more L1 caches comprises loading the machine code into an instruction cache (I-cache) of the processor; and
loading the packet context data into the one or more L1 caches comprises loading the packet context data into a data cache (D-cache) of the processor.

7. The computer-implemented method of claim 5, wherein:
the processor comprises an advanced RISC machine (ARM)-based processor or an x86-based processor; and
the machine code is in a machine language for the ARM-based processor or the x86-based processor.

8. The computer-implemented method of claim 5, wherein the packet context data comprises at least one of:
a particular protocol type used to communicate the data packet;
a particular destination port value for the data packet; or
a particular CIDR block associated with the communication device.

9. The computer-implemented method of claim 8, wherein:
the allow data comprises at least one of:
an allowed protocol type for received data packets;
an allowed destination port value for the received data packets; or
an allowed classless inter-domain routing (CIDR) block for the received data packets; and
executing the machine code to compare the at least one of the allow data or deny data with the packet context data comprises at least one of:
comparing the allowed protocol type with the particular protocol type;
comparing the allowed destination port value with the particular destination port value; or comparing the allowed CIDR block with the particular CIDR block.

10. The computer-implemented method of claim 5, wherein:
the byte code is received from a compilation service and is Extended Berkeley Packet Filter (eBPF) code representing the firewall rule for the computing resource; and
compiling the byte code includes compiling, using a just-in-time (JIT) compiler, the eBPF code into the machine code for the processor.

11. The computer-implemented method of claim 5, wherein:
the computing resource comprises a virtual network and the firewall rule comprises a network access control list (ACL) for the virtual network; or
the computing resource comprises a virtual machine (VM) instance and the firewall rule comprises a virtual firewall that filters network traffic for the VM instance.

12. A system comprising:
one or more processors; and
one or more computer-readable media storing computer-executable instructions that, when executed by the one or more processors, cause the one or more processors to:
obtain byte code representing a firewall rule for a computing resource, the firewall rule indicating at least one of allow data or deny data;
receive a data packet in a data flow from a communication device, the data packet comprising packet context data;
compile the byte code into machine code that represents the firewall rule;
load the machine code into a level-1 (L1) cache memory on a processor of the one or more processors;
load the packet context data into the L1 cache memory;
execute, at least partly by the processor, the machine code to compare the at least one of allow data or deny data with the packet context data; and
determine, based at least in part on executing the machine code, whether to block the data packet or allow the data packet to be communicated to the computing resource.

13. The system of claim 12, wherein
loading the machine code into the L1 cache memory comprises loading the machine code into an instruction cache (I-cache) of the processor; and
loading the packet context data into the L1 cache memory comprises loading the packet context data into a data cache (D-cache) of the processor.

14. The system of claim 12, wherein:
the processor comprises an advanced RISC machine (ARM)-based processor or an x86-based processor; and
the machine code is in a machine language for the ARM-based processor or the x86-based processor.

15. The system of claim 12, comprising further computer-executable instructions that, when executed by the one or more processors, cause the one or more processors to:
extract the packet context data from the data packet, the packet context data comprising at least one of:
a particular protocol type used to communicate the data packet;
a particular destination port value for the data packet; or
a particular CIDR block associated with the communication device.

16. The system of claim 15, wherein:
the allow packet data comprises at least one of:
an allowed protocol type for received data packets;
an allowed destination port value for the received data packets; or
an allowed classless inter-domain routing (CIDR) block for the received data packets; and
executing the machine code to compare the allow data with the packet context data comprises at least one of:
comparing the allowed protocol type with the particular protocol type;
comparing the allowed destination port value with the particular destination port value; or
comparing the allowed CIDR block with the particular CIDR block.

17. The system of claim 16, wherein the packet context data and the allow data are located in the L1 cache memory such that execution of the machine code is performed independent of data access to main memory of the processor.

18. The system of claim 12, comprising further computer-executable instructions that, when executed by the one or more processors, cause the one or more processors to:
receive, from a compilation service, the byte code comprising Extended Berkeley Packet Filter (eBPF) code representing the firewall rule for the computing resource; and
compile, using a just-in-time (JIT) compiler, the eBPF code into the machine code for the processor.

19. The system of claim 12, wherein:
the computing resource comprises a virtual network and the firewall rule comprises a network access control list (ACL) for the virtual network; or
the computing resource comprises a virtual machine (VM) instance and the firewall rule comprises a virtual firewall that filters network traffic for the VM instance.

* * * * *